United States Patent Office 2,804,920
Patented Sept. 3, 1957

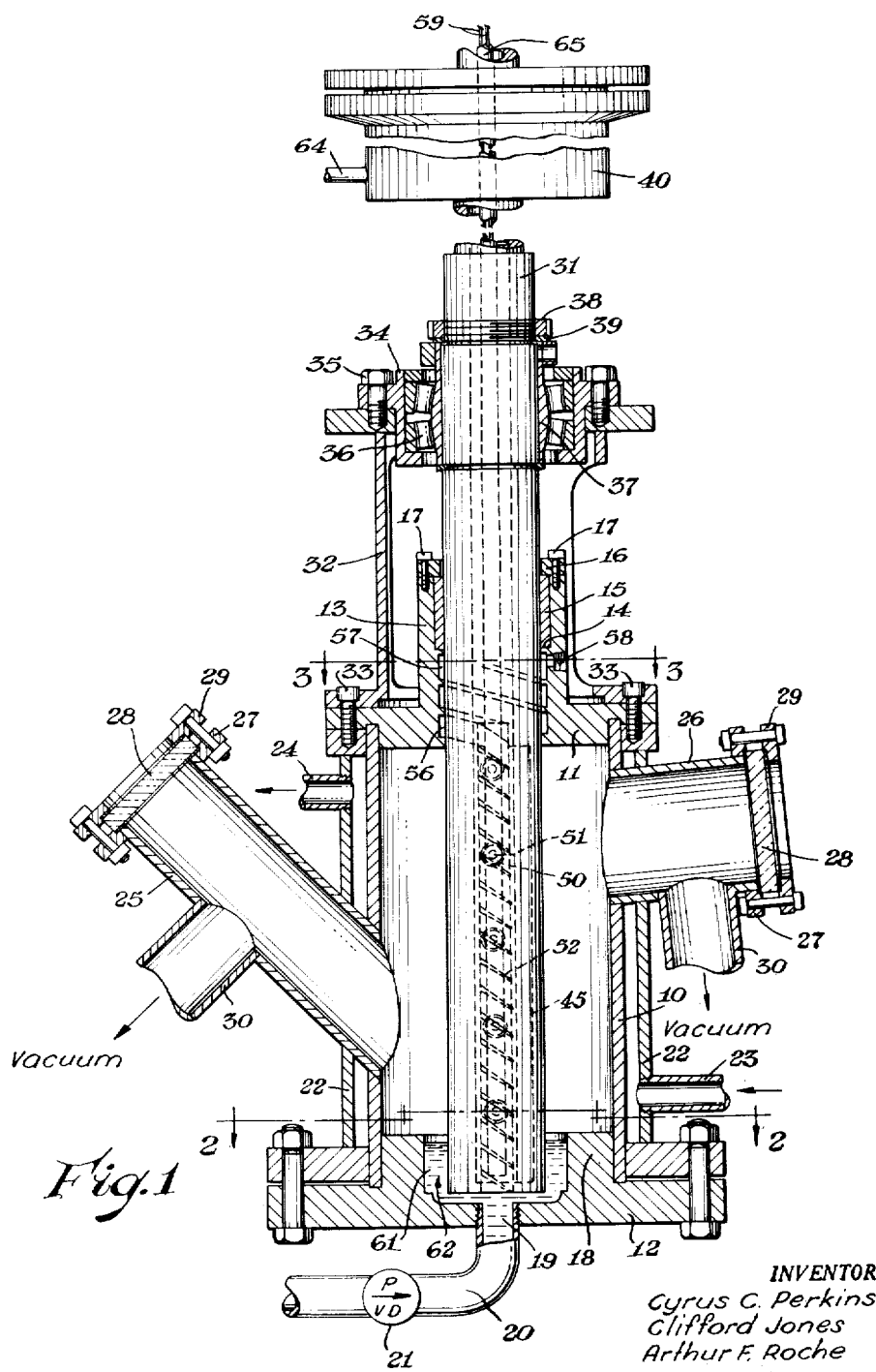

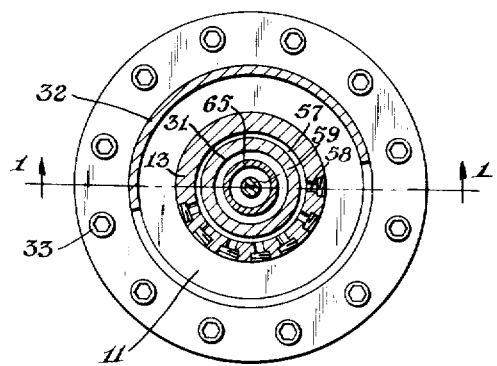

2,804,920

DEVOLATILIZER FOR POLYMERIC MATERIALS

Cyrus C. Perkins, Kawkawlin, Clifford Jones, Linwood, and Arthur F. Roche, Freeland, Mich., assignors to The Dow Chemical Company, Midland, Mich., a corporation of Delaware Application May 26, 1955, Serial No. 511,246

2 Claims. (Cl. 159—11)

This invention relates to an apparatus for devolatilizing polymers, i. e., for freeing them from volatile matter. More particularly it relates to an apparatus for ridding polystyrene of minor amounts of monomeric styrene.

For practical reasons, polymerization reactions are seldom carried to 100 percent completion in commercial practice. That leaves small amounts of unpolymerized monomer trapped within the polymer. No amount of drying and grinding will release that monomer and when the polymer is extruded, molded, or otherwise fabricated the trapped monomer volatilizes, causing imperfections in the fabricated article. In the past the machines and processes which have been devised for devolatilizing polymeric materials have suffered from many disadvantages. Some of those apparatuses consisted of modified extruders in which an opening was cut into the wall of the extruder to allow vapors to escape, often under high vacuum. Such an apparatus had high power requirements, required a large amount of floor space, and most serious of all with thermally-sensitive polymers, the amount of time that the polymer was exposed to high temperatures was very large compared to the amount of time that the polymer was being forwarded past the small devolatilizing zone. Consequently, the overall rate of devolatilization had to be very low. In other known apparatus, devolatilization is effected while the molten polymer is discharged into a large evacuated vessel as a falling stream. The streaming type devolatilizer had the disadvantages of being unable to handle polymers with a large amount of volatile material, of air leaking into the devolatilizing zone at the pumps, of the limited ability of the pumps to handle stiff or highly viscous polymers, and of the molten polymer spattering on and adhering to the walls. It would therefore be desirable to have a devolatilizing apparatus which would overcome most of the above objections.

It is accordingly an object of this invention to provide an improved apparatus for removing volatile materials from polymers.

It is a further object to provide a polymer devolatilizing apparatus which may be employed with polymers containing a very high percentage of volatile material.

The above and related objects are accomplished with an apparatus comprising an outer cylindrical casing within which revolves a shaft. A pool of molten polymer is introduced into the bottom of the casing to cover the lower end of the revolving shaft. As the shaft revolves a small amount of the molten polymer adheres to it and is conducted around the shaft. By having guides in contact with the shaft and fastened to the casing the polymer may be formed into a shallow ribbon which spirals up the shaft and finally out of the casing. If the outer casing is sealed, it is possible to reduced the pressure within the apparatus to aid in the devolatilization. Also, if the guides are small compared to the diameter of the shaft, the amount of time that the polymer is exposed to devolatilizing conditions will be very large compared to the amount of time that it is being directed along the shaft and in which it is not exposed to devolatilizing conditions.

The construction and operation of the apparatus will be more apparent from the drawings and following description which represents a preferred embodiment of a useful apparatus. In the drawings:

Fig. 1 is a vertical mid-section through the apparatus taken along line 1—1 of Fig. 3.

Fig. 2 is a cross-section of the apparatus along line 2—2 of Fig. 1.

Fig. 3 is a cross-section of the apparatus along line 3—3 of Fig. 1, and

Fig. 4 is a fragmentary isometric view of one of the grooved plates.

The apparatus consists of a vertically disposed cylindrical casing 10 to which is bolted an upper flange 11 and a lower flange 12. The upper flange 11 has a thicker central portion which is bored centrally forming a boss 13. The upper part of the central bore is of greater diameter than the lower portion and that upper part forms a seat 14 into which is inserted a bushing 15 whose inner diameter is the same as the lower portion of the bore. A ring clamp 16 is secured to the upper edge of the boss 13 with bolts 17 to hold the bushing 15 in place.

The lower flange 12 has a central boss 18 extending a short way into and fitting snugly against the inner walls of the casing 10. The central boss is axially counter-bored to form a cup 62 and an aperture 19 extends through the center of the lower flange 12 and communicates with the cup 62. A conduit 20 communicates with the aperture 19 for feeding molten polymer into cup 62 at the bottom of the casing 10. For metering the polymer, a variable drive polymer metering pump 21 is connected to the conduit.

The casing 10 has jacket walls 22 with an inlet 23 and outlet 24 to provide for the passage of heat transfer fluids through the jacket. It should be obvious that if further temperature control is desired, insulation (not shown) may be wrapped anywhere about the outer jacket walls 22 of the casing 10. To provide for an inspection of the operation of the apparatus without stopping and dismantling it, sight glass tubes may be provided. In the illustrated embodiment two such tubes 25, 26 are affixed to the inner wall of the casing 10 and extend radially outward through the outer wall 22. The outer end of each tube 25, 26 is upset forming a flange 27 and a seal for a suitable transparent window 28. The window 28 is secured in place by a ring clamp 29 bolted to the flange 27. The sight glass tubes 25, 26 are convenient locations for attaching pressure reducing apparatus. A hole is bored in the wall of each tube 25, 26 and a nipple 30 welded about each hole. Pressure reducing apparatus (not shown) may then be connected to the nipple 30. The tubes 25, 26 may be so mounted to the casing 10 that each tube will permit examination of a different portion of the interior of the casing.

A smooth surfaced shaft 31 extends through the central bore of the upper flange 11 through the center of the casing 10 to within a short distance of the bottom of cup 62 in the lower flange 12. The shaft 31 may be held in longitudinal alignment by a thrust bearing 36 located above the casing 10. The thrust bearing may be supported on brackets 32 affixed to the upper flange 11 with bolts 33. An annular bearing seat 34 may then be secured to the upper rim of brackets 32 with bolts 35. A tapered roller thrust bearing 36 may be seated in the annular seat 34 and bear against an enlarged journaled portion 37 on the shaft 31. To help maintain the shaft 31 at the proper depth in the casing 10 a collar 38 may be screwed onto a threaded part of the shaft 31 and bear against a bearing surface 39 of the thrust bearing 36.

The shaft 31 may be hollow so that heat transfer fluids may be circulated therein. To allow for that circulation, any of the well-known types of rotary union 40 may be mounted on the upper end of the shaft 31, receiving heat transfer fluid through a radial conduit 64 and discharging it through axial dip-tube 65.

Extending radially inward from the walls of the casing 10 and in a single plane through the axis of the vessel are two edge-grooved plates 45, 46. One of such plates 45, 46 is shown in fragmentary perspective in Fig. 4. The plates 45, 46 may be held in place by the means shown in detail in Fig. 2. An internally threaded collar 47 is welded to the casing 10 and to the outer jacket wall 22. A threaded lug 48 is screwed into that collar 47 and finally a bolt 49 bearing against the outer surface of the lug 48 is screwed into threaded sockets 50 in the grooved plates 45, 46. By drilling a small bore 51 in extension of the sockets 50 is the plates 45, 46 and by employing axially bored bolts 49, a thermocouple well is provided for convenient observation and control of the temperature of the plates 45, 46. The plates 45, 46 set into seats cut into the central boss 18 of the lower flange 12 and likewise into seats in the upper flange 11 in a manner as will be later described. Each plate 45, 46 is generally trapezoidal in horizontal cross-section (Fig. 2), the narrow side 63 of the trapezoid being of the same width as the thickness of the central boss 18 of the lower flange 12. The side of each plate 45, 46 abutting the inner wall of the casing 10 is curved to fit snugly against that wall. The broader base of the trapezoidal section is of a width slightly less than the distance from the inner wall of the casing 10 to the shaft 31. The inner slanting side of the trapezoidal section has an uninterrupted surface for about half the distance from the smaller side toward the larger. The remaining half of that surface has a series of inclined projecting radial lands 52 (Fig. 4) integral with the main body of the plate which extend into sliding contact with the shaft 31. The grooves 53 thus formed between lands 52 have bases which are a continuation of the trapezoidal section. The lands 52 are curved to bear against the shaft 31. Thus, the distance by which the lands 52 protrude at the end nearest the smaller end of the trapezoidal section is greater than the distance that they protrude at the other end and consequently the grooves 53 are generally wedge-shaped. As stated previously, the grooves 53 are inclined with the area of larger volume of the groove 53 lower than the area of smaller volume. The slope or pitch of each groove 53 should be one-half the height of the groove 53. The grooves 53 should be arranged so that the smaller opening of a groove 53 in one plate 45 is in horizontal alignment with the larger opening of a groove 53 in the opposite plate 46. It is likewise necessary that the grooves 53 in both plates 45, 46 be uniformly inclined with their smaller ends tilted toward the top of the device. By having the grooves 53 constructed and arranged as above described a viscous liquid substance which enters the larger opening of a groove 53 in one plate 45, is raised up the incline and leaves the smaller openings of that groove 53, thence is carried horizontally about the shaft 31 and enters the larger opening of a groove 53 in the opposite plate 46. After repeating these steps several times the substance is transported in successively higher stages to the topmost groove 53 in one of the plates 45, 46. In the illustrated embodiment, a double flight of grooves 53 is shown. In that case for any portion of the substance being transported alternate grooves 53 in each plate 45, 46 are used. Thus, if the substance enters the lowest groove 53 in one plate 45, it will enter the second groove 53 in the opposite plate 46, then the third groove 53 in the original plate 45. Concurrently, a second portion of the substance may enter the lowest groove 53 in the other plate 46, then the second groove 53 in plate 45 and so on through alternate grooves 53 to the top of the apparatus.

The grooved plates 45, 46 are so constructed that the grooved portion extends beyond the ungrooved portion leaving a shoulder 54. The shoulder 54 fits snugly against the underside of the upper flange 11 while the extended portion 55 fits into a niche cut into the upper flange 11. The topmost groove 53 of each plate 45, 46 is aligned with a separate helical channel 56 (Fig. 1) cut into the inner bearing surface of the boss 13 for each plate 45, 46. The two helical channels 56 make at least one complete revolution and empty into an annular passageway 57 cut into the boss 13. One or more apertures 58 (Figs. 1 and 3) may be bored radially through the boss 13 and communicate with the annular passageway 57.

As will be explained later, it is desirable to operate the apparatus with the rotating shaft 31 at one temperature and the grooved plates 45, 46 at a higher temperature. A convenient means for maintaining such a constant temperature gradient is a differential temperature controller. Thus, a thermocouple may be extended into the hollow central shaft 31 in a thermocouple well as shown by protruding lead wires 59 in Fig. 1 and a second controlling thermocouple may be inserted in one of the wells 51 in the grooved plates as shown by the protruding lead wires 60 in Fig. 2. Both thermocouples may then be connected to a conventional differential temperature controlling device (not shown).

For ease of description, the operation of the apparatus will be described using polystyrene as the polymer to be devolatilized. The polystyrene is heated to a fluid condition such that it may be pumped and is metered into the casing 10 through the aperture 19 in the lower flange 12, forming a pool of molten polymer 61 in cup 62 at the base of the casing 10. The depth of the pool 61 should be such that the lower end of the shaft 31 and the lower opening of the lowest groove 53 in each of the plates 45, 46 is completely submerged. The apparatus should be heated to keep the polystyrene in a molten condition. There are preferred temperatures at which to operate the apparatus. These result from the discovery that the coefficient of friction of polystyrene against polished steel increases rapidly to a maximum in the temperature range just above the heat distortion temperature, i. e. in the 80° C. to 120° C. range, and then decreases rapidly with increasing temperature. The optimum operating temperatures for the devolatilizing apparatus of this invention are then to have the rotating shaft 31 at a temperature at which the coefficient of friction is at a maximum and the grooved plates 45, 46 at a higher temperature where the coefficient of friction is lower. The polystyrene, under such conditions, adheres preferentially to the rotating shaft 31 and slips past the surfaces of the grooves 53.

When the shaft 31 is rotated, the polystyrene in the pool 61 at the base of the casing 10 tends to adhere to the shaft 31 and enters the lower port or opening of the lowest groove 53 in each of the plates 45, 46. It is then directed up the shaft 31 through the groove 53, emerging at a point on the shaft 31 above the pool of molten polymer 61. The ribbon of polystyrene thus formed in one plate 45 adheres to the shaft 31 and is carried around to the lower opening of the second groove 53 in the second plate 46, where the ribbon is directed up another distance by that groove 53, emerging at the upper port. By continually rotating the shaft 31 the ribbon of polystyrene is carried to the top of the shaft 31 by alternately being directed up the shaft by the slanted grooves 53, emerging from the upper openings of the grooves 53, and being transported by the rotating shaft 31 to the opposite grooved plate 45, 46. All of the time that the ribbon of polystyrene is outside of the grooves 53 it is subject to the devolatilizing conditions within the chamber. Thus, by having the grooves 53 relatively shallow and the plates 45, 46 relatively thin, the amount of time that a unit volume of polystyrene is subject to the devolatilizing conditions of reduced pressure and elevated temperature is very high.

The polymer, after leaving the upper opening of the highest groove 53 in plates 45, 46, then enters the helical channel 56 in the bearing surface of the boss 13 in the upper flange 11. After traveling through that channel 56 it emerges into passageway 57 and then from the devolatilizing apparatus by means of aperture 58 as a strand which is easily cooled and pelletized, ground, or in some other manner brought into a convenient form for packaging. The channel 56 and passageway 57 in the boss 13 serve a dual purpose. The first is to provide an outlet for the polymer strand and the second is to act as a pressure seal between the reduced pressure area within the devolatilizing apparatus and the surrounding outside atmosphere.

Polymers may be more efficiently devolatilized with the apparatus of the present invention than with any prior apparatus. The most important factor contributing to that efficiency is the ratio of the time the polymer is actually subject to devolatilizing conditions as compared to the time that the polymer is being directed or guided to a different level within the apparatus. That such a ratio is very high for the present apparatus is a prime advantage over prior extruder type devolatilizers. As previously mentioned, the time that a polymer is subject to devolatilizing conditions in an extruder type devolatilizer is very small compared to the time that the polymer is being forwarded to the devolatilizing area and being carried away from it.

The operation of the devolatilizing apparatus will be made more apparent from the following illustrative example in which all parts are by weight.

*Example 1*

A solution of 26.3 percent polystyrene in styrene monomer was pumped into the herein described devolatilizer at the rate of 4.18 parts per hour. The temperature of the rotating shaft was 160° C. and the temperature of the casing and grooved plates was 250° C. The pressure within the devolatilizer was reduced to 50 mm. Hg, absolute. The polymer issuing from the discharge aperture 58 contained 0.95 percent volatile matter, indicating that 99.66 percent of the original monomer had been removed.

We claim:

1. An apparatus for removing volatile substances from viscous fluid polymers comprising a vertical cylindrical casing enclosed at each end with flanges, the lower of said flanges having a small central feed opening, the other of said flanges having an axially aligned bearing therethrough, a pair of radially disposed vertical plates fastened to the inner wall of the casing, a plurality of upwardly inclined, spaced, groove-forming, radial lands projecting from the inner surfaces of said plates and bearing against a central, rotatable, smooth-surfaced, metal shaft extending through the said axially aligned bearing nearly to the bottom of said casing, the slope of each groove-forming land being at least as great as one-half the distance between said groove-forming lands, said groove-forming lands being positioned and spaced on each plate so that the upper extremity of each land on one plate is in horizontal alignment with the lower extremity of a similar land on the other said plate, means for supplying polymer in fluid condition to said apparatus through the opening in said lower flange to form a pool thereof in the casing to cover the lower end of the shaft, means for rotating said shaft, means for evacuating said casing, and means associated with said axial bearing on the said other flange for discharging the devolatilized polymeric material from the apparatus.

2. In the apparatus claimed in claim 1, means for maintaining the axial rotary shaft at a temperature at which the viscous fluid is adherent to the metal shaft and means for maintaining said grooved plates at a higher temperature at which the viscous fluid is relatively non-adherent to the plates.

References Cited in the file of this patent

UNITED STATES PATENTS

| | | |
|---|---|---|
| 874,598 | Jensen | Dec. 24, 1907 |
| 1,284,074 | Du Pont | Nov. 5, 1918 |
| 1,880,990 | Smith | Oct. 4, 1932 |
| 1,914,084 | Ellis et al. | June 13, 1933 |

U. S. DEPARTMENT OF COMMERCE
PATENT OFFICE
CERTIFICATE OF CORRECTION

Patent No. 2,804,920 September 3, 1957

Cyrus C. Perkins et al.

It is hereby certified that error appears in the printed specification of the above numbered patent requiring correction and that the said Letters Patent should read as corrected below.

Column 1, line 66, for "reduced" read -- reduce --; column 3, lines 47 and 48, for "arranged so" read -- arranged vertically so --; line 57, for "openings" read -- opening --.

Signed and sealed this 18th day of March 1958.

(SEAL)
Attest:

KARL H. AXLINE

Attesting Officer

ROBERT C. WATSON
Commissioner of Patents